Patented Jan. 10, 1939

2,143,835

UNITED STATES PATENT OFFICE 2,143,835

FODDER AND METHOD OF MAKING THE SAME

Lynwood H. Smith, Kansas City, Mo., and Charles F. Schnabel, Kansas City, Kans.; said Schnabel assignor to said Smith No Drawing. Application May 16, 1938, Serial No. 208,206

9 Claims. (Cl. 99—8)

Our invention relates to fodder and to a method of making the same, and more particularly to a fodder of greens such as grasses, legumes, vegetables, and the like, possessing high food value and biological worth in excess of anything known to the art.

This application is a continuation in part of our co-pending application, Serial No. 48,056, filed November 2, 1935.

It has been frequently observed that immature green fodder of grasses, legumes, or vegetables has a higher feeding value than the corresponding dried products. Then, too, the younger the plants the higher the proportion of contained water resulting in increased difficulty in drying them.

Dehydration lowers the biological value of fodders especially when desiccated by heat. This is probably due to the oxidation and/or pyrolytic decomposition of the more labile and unstable constituents of the fodders. A dried fodder, for example, is markedly inferior in its carotene content, resulting in a deficiency in vitamin A, the anti-infective vitamin. Then, too, the unsaturated lipins are destroyed. It is likely, further, that other aromatic and unsaturated compounds will polymerize, lowering their biological value so that a desiccated or dried fodder is distinctly inferior as a feed when compared to the fresh feed. This lowered biological value is further contributed to by the leaching of soluble materials, enzymic and bacterial decomposition of proteins and injury to certain vitamins and leaf pigments by oxidation and desiccation.

No method of preserving these immature fodders by ensiling has proven satisfactory for poultry, hogs, horses, and small animals such as pigs, rabbits, cats, and birds. These classes of animals, consequently, have no satisfactory source of succulent greens in a preserved state. The only satisfactory method of preserving vegetables and greens for human us has been canning and sterilization by heat. The canning process, however, injures certain vitamins.

In ordinary silage, as it is known to the art, lactic acid is formed by fermentation, but other reactions take place which render ensilage unpalatable to the classes of animals above named and for human consumption.

A method of dehydration which appears to leave vitamins and biologically beneficial elements present in the feed in high quantities, is the so-called "flotation" process. This method contemplates contacting the greens momentarily to a hot gas. The temperature at which this contact may be made may range from 900° F. to 1800° F. It appears that the leaf is not injured by the contact with high temperatures due to the fact that the evaporation of water present serves to keep the interior of the leaf at a temperature below which damage is done to the vitamins. The temperature, however, is sufficiently high to kill the bacteria on the surface of the leaves and to destroy enzymatic action. The momentary high temperature besides destroying bacteria and enzymatic action, paralyzes the stomata of the leaves which are normally in open position in a turgid leaf.

The method of dehydration pointed out above will retain a high chlorophyll content in the dried product. We have found, however, that when this dried product is stored in ordinary manner, it will lose its carotene content at about the rate of 50 percent per month and will become worthless as a source of vitamin A due to the deterioration of its chlorophyll, carotene and xanthophyll content. It appears that these three factors vary as a function of the chlorophyll content so that, if the chlorophyll can be preserved, the other biological factors are likewise preserved. It is known that dried greens may be kept in cold storage in order to prevent a decrease in their biological value. The cold storage, however, of bulky products, such as dehydrated greens is an expensive proceeding. The cost of cold storage is so prohibitive that farmers cannot employ it. Even at 70° F. the loss of carotene content in dried greens will average about 10 percent per month.

One object of our invention is to provide a method of preserving young fodders such as grasses, legumes, vegetables and the like in substantially their fresh state, for use when fresh green fodder is not available.

Another object of our invention is to provide a fodder of high food and biological value.

Another object of our invention is to provide a ration containing all factors needed for health, growth, and reproduction, including vitamins, proteins, lipins and minerals.

Another object of our invention is to provide a method of preserving dehydrated greens for use when fresh green fodder is not available in such a manner that the vitamin and chlorophyll content will be retained.

Other and further objects of our invention will appear from the following description.

In general, our invention contemplates the harvesting of young grasses, legumes, vegetables, and the like and subjecting them to our preserving method, which contemplates the use of buttermilk as a preservative. The young grasses, legumes, or vegetables may be preserved either in the fresh state or, if desired, subjected to a method of dehydration which will leave the vitamin and biologically beneficial elements present as for example that pointed out above. The admixing with buttermilk or the dehydration, followed by preservation with buttermilk should take place within a short period of time after harvesting.

By "buttermilk" we mean any milk product such as churned buttermilk, whole milk, skim milk or cream which has been soured by fermentation.

By way of example and not by way of limitation, in practicing our invention with the preservation of fresh greens, we harvest our greens which may be grasses, legumes, vegetables or the like. These are then cut in the field and cleaned, pulped and packed in air tight containers.

The containers in which the freshly harvested, washed, and pulped greens are placed may be provided with relief valves for the release of any gases of fermentation. The containers are filled completely full to exclude all air. A convenient method of handling the fresh greens is to pulp them to such an extent that they are in a fluid or semi-fluid condition, that is, to such constituency that they may be pumped. The pulped greens may then be pumped through a pipe line into a container containing a quantity of oil such as cottonseed oil or other edible oil. The oil being lighter than the pulped mass will float thereon and act as a floating cover, excluding all air and, at the same time, releasing the entrapped air and such gases as might be formed. Inasmuch as fresh fodder contains from 80% to 90% of moisture, it is comparatively easy to pulp the same to such constituency that it may be pumped or allowed to flow by gravity into the storage vats containing the oil sealing layers.

In order to increase the food value of the pulped greens and, at the same time, preserve them, we employ buttermilk, which contains serum solids and calcium and magnesium salts such cottonseed oil or other edible oil. The oil being lighter than the pulped mass will float thereon and act as a floating cover, excluding all air and, at the same time, releasing the entrapped air and such gases as might be formed.

In order to increase the food value of the pulped greens and, at the same time, preserve them, we employ buttermilk, which contains serum solids and calcium and magnesium salts such as phosphates which are necessary for a balanced ration.

In using buttermilk as a preservative, we mix one pound of fresh, comminuted or pulped greens with about four pounds of ripened, raw buttermilk. It is to be understood, of course, that this mixture is made immediately, before fermentation sets in. If desired, the discharge from the pulping operation can be into a common receptacle into which buttermilk is also fed. After the buttermilk and the fresh pulped greens are intimately mixed, the mixture is passed to a vacuum pan where in a zone of reduced pressure a large proportion of moisture is evaporated by the agency of heat. The use of a reduced pressure enables evaporation to proceed at lower temperatures than would be otherwise possible. The evaporation method is well known to the art and does not constitute a part of our invention. The evaporation is carried on to obtain a condensed mixture which has been partially dehydrated so that the resulting mass will contain about 30% solids. The condensed, viscous mixture is employed as a fodder and will keep indefinitely in barrels, as will ordinary condensed buttermilk.

Another method of preserving the green fodders contemplates the addition of buttermilk previously condensed to a lactic acid content of at least 5 percent, together with a carbohydrate such as molasses. The condensed buttermilk and carbohydrate mixture consists of equal parts by weight of condensed buttermilk and molasses and is fed into the freshly pulped mass in proportion of about one percent to ten percent by weight. It is to be understood, of course, that the freshly pulped mass is in a container and covered with a layer of oil to exclude the air, it being a feature of our invention to exclude oxygen from the material before the natural respiration of the leaf has ceased.

Our experiments have shown us that the main cause of failure in all past efforts to make a satisfactory silage out of young, succulent, high protein containing material has been due to the presence of oxygen. Any wilting of the leaf before pulping and storage or storage in the presence of oxygen after pulping induces the formation of butyric acid and produces a sour silage. In accordance with the modification of our method of preservation in which a mixture of buttermilk and a carbohydrate is employed, the mixture acts as a starter and natural fermentation ensues forming a silage. The silage thus prepared ferments at low temperatures (under 25° C.) and develops two percent of acidity and a pH below four, within a few days. If desired, an inorganic acid, such as hydrochloric acid, may be added in small quantities to lower the pH of the mixture. The pulped ensilage mass thus formed may be kept indefinitely and retains its original color.

We have found that it is possible to form a silage of fresh fodders pulped in the manner described immediately after harvesting and stored in the absence of air, by natural fermentation. The addition of buttermilk and a carbohydrate, however, not only serves as a starter but beneficially controls the fermentation so that the proper acidity and pH are developed in a markedly shorter time.

The silage thus produced has a pleasant aroma and a fruity taste and furnishes a source of fresh succulent greens for stock and for year around use. The added buttermilk incorporates milk proteins and serum solids as well as milk salts.

It is understood that by greens we mean grasses, legumes and vegetables having a chlorophyll content. Furthermore, while our fodder is primarily of value for use in feeding animals, certain vegetables, as for example spinach, can be satisfactorily preserved by our method for human consumption. For vegetables intended for human consumption, careful washing must immediately follow the harvesting and the process must be carried out with great care. It will be readily apparent that, by means of our method of preservation, the vitamins and more labile compounds which are of great biological and nutritional value, are preserved.

Instead of preserving the entire pulp, the fresh greens may be subjected to a pressing operation to extract the juices and the juices may then be preserved by means of buttermilk or lactic acid bacillus fermentation in the absence of air, in the manner described above for the preservation of the pulped greens. The preserved liquid may then be added to the usual dry rations, giving animals a vitamin and lipin quota which appears to be so beneficial to health and the proper functioning of the animal organism.

Likewise, a convenient preparation can be made for human consumption where a deficiency of vitamins in a diet is indicated.

When the dehydrated product is subjected to preservation with buttermilk, the dehydration takes place in such a manner as to cause minimum damage to the biologically beneficial elements. We prefer to use the dehydration method called the "flotation process". The dehydration, as pointed out above, takes place within a short time after harvesting. The dehydrated product is a bright green in color, indicating that it has retained a high chlorophyll content. This chlorophyll content will deteriorate in storage and we subject the dehydrated product to preservation by means of our method employing buttermilk. We have found that the buttermilk preserves the chlorophyll and that this result is not due to the lactic acid content alone. When lactic acid solutions are used, of strength comparable to the lactic acid content of the buttermilk, we have found that the chlorophyll content is destroyed and the greens will turn brown, showing deterioration in its biological content. The dehydrated greens may, if desired, be comminuted and the comminuted, dehydrated greens preserved by buttermilk.

It will be seen that we have accomplished the objects of our invention. We have provided a fodder comprising comminuted greens intimately mixed and preserved by buttermilk in such a manner that the chlorophyll content will be retained. By means of our invention we are able to supply farmers, stockmen and poultrymen with a feed containing all the necessary factors for health, growth and reproduction including vitamins, proteins, lipins and minerals. These factors are not present or are greatly reduced in known feeds.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A fodder comprising comminuted greens intimately admixed and preserved with buttermilk.

2. A fodder comprising in combination a minor proportion of comminuted fresh greens intimately admixed and preserved with a major proportion of buttermilk.

3. A fodder comprising in combination comminuted fresh greens intimately admixed and preserved with buttermilk in proportion of approximately one part of fresh greens by weight to approximately four parts of buttermilk by weight.

4. A fodder comprising in combination a partially dehydrated intimate mixture of comminuted fresh greens and buttermilk, the latter acting as a preservative agent.

5. A fodder comprising in combination an intimate mixture of comminuted fresh greens and buttermilk, partially dehydrated to a solids content of approximately 30 percent, said buttermilk acting as a preservative agent.

6. A method of preserving fodders including the steps of harvesting young, fresh, succulent greens, and admixing the fresh greens with buttermilk.

7. A fodder comprising dehydrated greens having a high chlorophyll content intimately admixed and preserved with buttermilk.

8. A fodder comprising in combination a minor proportion of dehydrated comminuted greens having a high chlorophyll content intimately admixed and preserved with a major proportion of buttermilk.

9. A fodder comprising in combination partially dehydrated, chlorophyll containing, comminuted greens admixed with buttermilk, the latter acting as a preservative agent.

LYNWOOD H. SMITH.
CHARLES F. SCHNABEL.